United States Patent
Lee

(10) Patent No.: US 9,377,025 B2
(45) Date of Patent: Jun. 28, 2016

(54) COMPRESSOR HOUSING AND TWO-STAGE TURBOCHARGER THEREOF

(75) Inventor: Jangsin Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 791 days.

(21) Appl. No.: 13/566,662

(22) Filed: Aug. 3, 2012

(65) Prior Publication Data

US 2013/0142623 A1 Jun. 6, 2013

(30) Foreign Application Priority Data

Dec. 6, 2011 (KR) .......................... 10-2011-0129637

(51) Int. Cl.
| | |
|---|---|
| F04D 25/02 | (2006.01) |
| F04D 17/12 | (2006.01) |
| F04D 29/42 | (2006.01) |
| F04D 29/58 | (2006.01) |
| F01D 9/02 | (2006.01) |
| F02C 6/12 | (2006.01) |

(52) U.S. Cl.
CPC .............. *F04D 25/024* (2013.01); *F01D 9/026* (2013.01); *F02C 6/12* (2013.01); *F04D 17/12* (2013.01); *F04D 29/4206* (2013.01); *F04D 29/584* (2013.01); *F05D 2240/14* (2013.01)

(58) Field of Classification Search
CPC ... F04D 25/024; F04D 25/045; F04D 29/584; F04D 29/4206; F04D 17/12; F02B 37/04; F02B 39/05; F02B 37/004; F02B 37/005; F02C 6/12; F01D 9/026; F05D 2240/14
See application file for complete search history.

(56) References Cited

U.S. PATENT DOCUMENTS

| | | | | |
|---|---|---|---|---|
| 7,010,916 | B2 * | 3/2006 | Sumser et al. ................. | 60/602 |
| 2009/0031722 | A1 * | 2/2009 | An et al. ......................... | 60/600 |

FOREIGN PATENT DOCUMENTS

| | | |
|---|---|---|
| JP | 6-66146 A | 3/1994 |
| JP | 2003-35153 A | 2/2003 |
| KR | 101038369 B1 * | 1/2011 |
| KR | 10-1038369 B1 | 6/2011 |
| WO | WO 2008/043539 A1 | 4/2008 |

\* cited by examiner

*Primary Examiner* — Richard Edgar
*Assistant Examiner* — Brian P Wolcott
(74) *Attorney, Agent, or Firm* — Morgan, Lewis & Bockius LLP

(57) ABSTRACT

A compressor housing surrounds an impeller of a compressor, compressing and discharging air suctioned from the impeller, the compressor may include a body having an impeller seating portion where the impeller is installed at the center of the body, an air inflow hole being in communication with the impeller seating portion formed at one side of the body, an air outflow hole formed at the other side of the body, and a scroll-shaped air path being in communication with the air inflow hole to the air outflow hole while surrounding the impeller seating portion, and a cooling chamber provided in the body, which has a cooling water path through which cooling water cooling air that flows on the air path flows and a plurality of exits being in communication with the cooling water path.

5 Claims, 4 Drawing Sheets

COMPRESSOR HOUSING AND TWO-STAGE TURBOCHARGER THEREOF

CROSS-REFERENCE TO RELATED APPLICATION

The present application claims priority of Korean Patent Application No. 10-2011-0129637 filed Dec. 6, 2011, the entire contents of which application is incorporated herein for all purposes by this reference.

BACKGROUND OF INVENTION

1. Field of Invention

The present invention relates to a compressor housing and a two-stage turbocharger thereof, and more particularly, to a compressor housing including a cooling device and a two-stage turbocharger thereof.

2. Description of Related Art

In general, a turbocharger rotates a turbine by using pressure of exhaust gas discharged from an engine and thereafter pushes air suctioned by using the rotational force at higher pressure than atmospheric pressure to increase an output.

In recent years, in a turbocharger of a diesel engine, a high pressure-stage turbocharger having a high-pressure turbine driven by the exhaust gas discharged from the engine and a low pressure-stage turbocharger having a low-pressure turbine driven by exhaust gas discharged after driving the high-pressure turbine are placed on a path of the exhaust gas, the suctioned air is one-stage pressurized by a low-pressure compressor of the low pressure-stage turbocharger and two-stage pressurized by the high-pressure compressor of the high pressure-stage turbocharger and thereafter, supplied to the engine.

In general, the air pressurized by the low-pressure compressor is cooled through a cooling device mounted between a low-pressure compressor housing and a high-pressure compressor housing. Therefore, turbo efficiency is enhanced and fouling is suppressed.

However, an additional cooling device is installed between the low-pressure compressor housing and the high-pressure compressor housing, and as a result, a structure of the turbocharger becomes complicated and a manufacturing cost increases.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a compressor housing of a turbocharger that effectively cools air pressurized by a low-pressure compressor.

The present invention has been made in an effort to provide a compressor housing of a turbocharger including a cooling device that simplifies a structure of the turbocharger.

Various aspects of the present invention provide for a compressor housing of a turbocharger surrounding an impeller of a compressor, and compressing and discharging air suctioned from the impeller, including a body having an impeller seating portion where the impeller is installed at the center of the body, an air inflow hole being in communication with the impeller seating portion formed at one side of the body, an air outflow hole formed at the other side of the body, and a scroll-shaped air path being in communication with the air inflow hole to the air outflow hole while surrounding the impeller seating portion, and a cooling chamber provided in the body, which has a cooling water path through which cooling water cooling air that flows on the air path flows and a plurality of exits being in communication with the cooling water path.

The cooling chamber may be formed while adjacently surrounding an inner surface of the body with the air path.

The cooling chamber may have an annular shape of which both ends are separated from each other.

The plurality of exits may be provided at both ends of the cooling chamber.

A line through which the cooling water flows in may be selectively installed at at least one of the plurality of exits and a line through which the cooling water flows out may be installed at the other one.

Various aspects of the present invention provide for a two-stage turbocharger in which a high pressure-stage turbocharger including a high-pressure turbine driven by exhaust gas discharged from an engine and a low pressure-stage turbocharger including a low-pressure turbine driven by the exhaust gas discharged after driving the high-pressure turbine are placed on a path of the exhaust gas, suctioned gas is one-stage pressurized by a low-pressure compressor of the low pressure-stage turbocharger and two-stage pressurized by a high-pressure compressor of the high pressure-stage turbocharger, including the low-pressure compressor including an impeller rotated by the low-pressure turbine, and a compressor housing surrounding the impeller and compressing and discharging air suctioned from the impeller, a body having an impeller seating portion where the impeller is installed at the center of the body, an air inflow hole being in communication with the impeller seating portion formed at one side of the body, an air outflow hole formed at the other side of the body, and a scroll-shaped air path being in communication with the air inflow hole to the air outflow hole while surrounding the impeller seating portion, and a cooling chamber provided in the body, which has a cooling water path through which cooling water cooling air that flows on the air path flows and a plurality of exits being in communication with the cooling water path.

The cooling chamber may be provided in an opposite direction to the low-pressure turbine and formed while adjacently surrounding an inner surface of the body with the air path.

The cooling chamber may have an annular shape of which both ends are separated from each other.

The plurality of exits may be provided at both ends of the cooling chamber.

Air pressurized by a low-pressure compressor may be effectively cooled.

A manufacturing cost can be reduced by simplifying a structure of a turbocharger.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
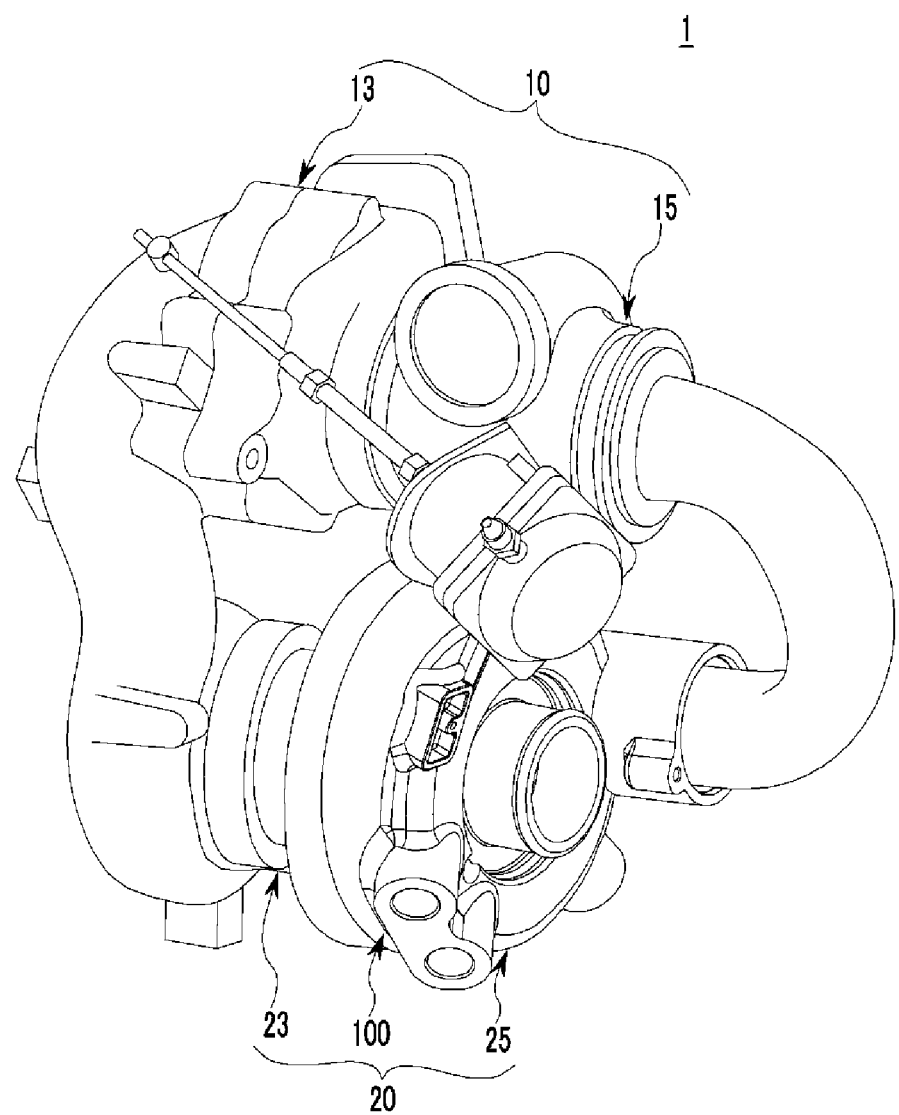
FIG. 1 is a diagram illustrating an exemplary two-stage turbocharger according to the present invention.

FIG. 1 is a diagram illustrating a two-stage turbocharger according to various embodiments of the present invention.

Referring to FIG. 1, a two-stage turbocharger 1 includes a high pressure-stage turbocharger 10 and a low pressure-stage turbocharger 20.

The high pressure-stage turbocharger 10 includes a high-pressure turbine 13 driven by exhaust gas discharged from an engine and a high-pressure compressor 15 suctioning, compressing and discharging air by rotational force.

The low pressure-stage turbocharger 20 includes a low-pressure turbine 23 driven by the exhaust gas discharged after driving the high-pressure turbine 13 and a low-pressure compressor 25 suctioning, compressing and discharging air by rotational force of the low-pressure turbine 23.

In the two-stage turbocharger 1, the exhaust gas discharged from the engine is discharged to an exhaust pipe while driving the high-pressure turbine 13 and the low-pressure turbine 23 and the air suctioned by the low-pressure compressor 25 rotated by the low-pressure turbine 23 is primarily pressurized and the pressurized air is suctioned into the high-pressure compressor 15 rotated by the high-pressure turbine 13 to be secondarily pressurized.

The high-pressure turbine 13 and the low-pressure turbine 23 are provided in the same configuration as a turbine of a general turbocharger. That is, the high-pressure turbine 13 and the low-pressure turbine 23 include a turbine housing with an exhaust gas path through which exhaust gas is introduced and discharged and a turbine wheel mounted within the turbine housing and rotated by the exhaust gas.

The high-compressor 15 is also provided in the same configuration as a compressor of the generator turbocharger. That is, the high-pressure compressor 15 includes a compressor housing with an air path through which the suctioned air is compressed and discharged and an impeller mounted within the compressor housing and rotated by the turbine wheel of the high-pressure turbine.

The high-compressor 25 is also provided in the similar configuration as the compressor of the general turbocharger like the high-pressure compressor 15. However, in the low-pressure compressor 25, a cooling chamber 120 cooling air suctioned from an impeller 28 is provided within a compressor housing 100.

Figure 2:
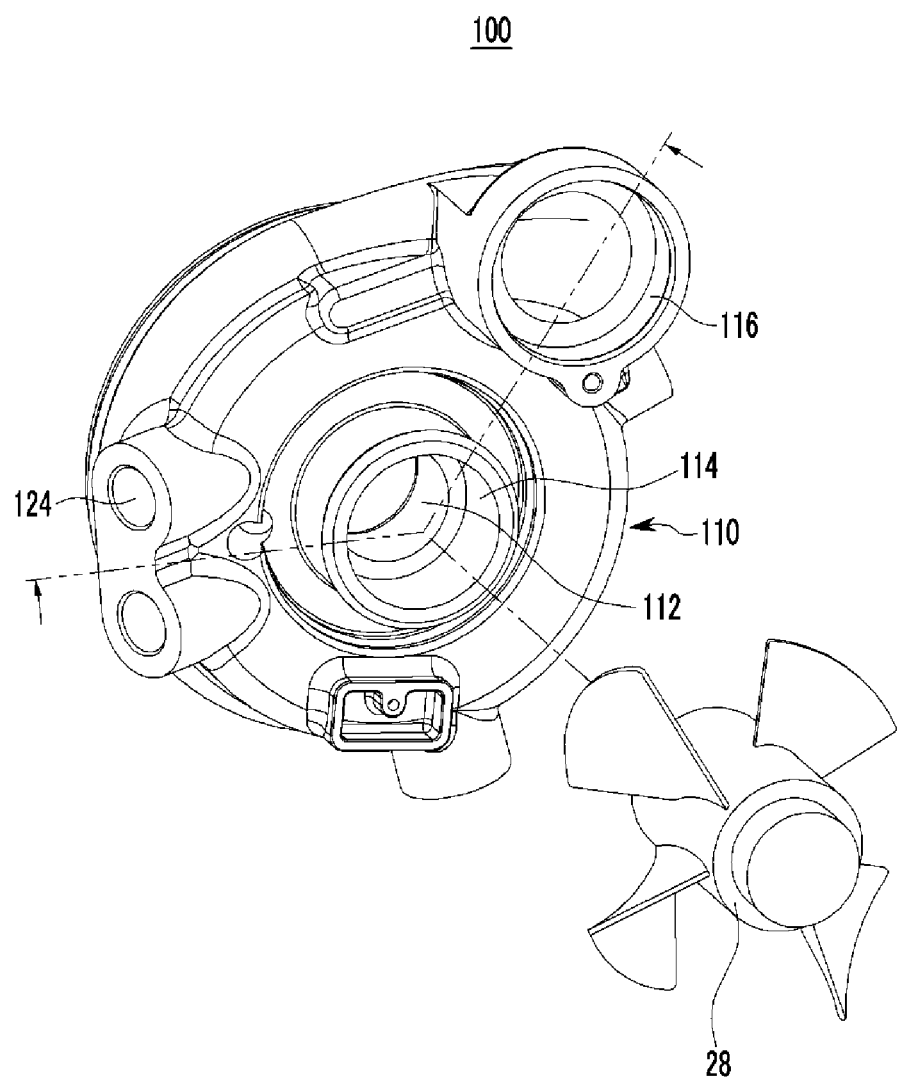
FIG. 2 is a diagram illustrating an exemplary compressor housing according to the present invention.
Figure 3:
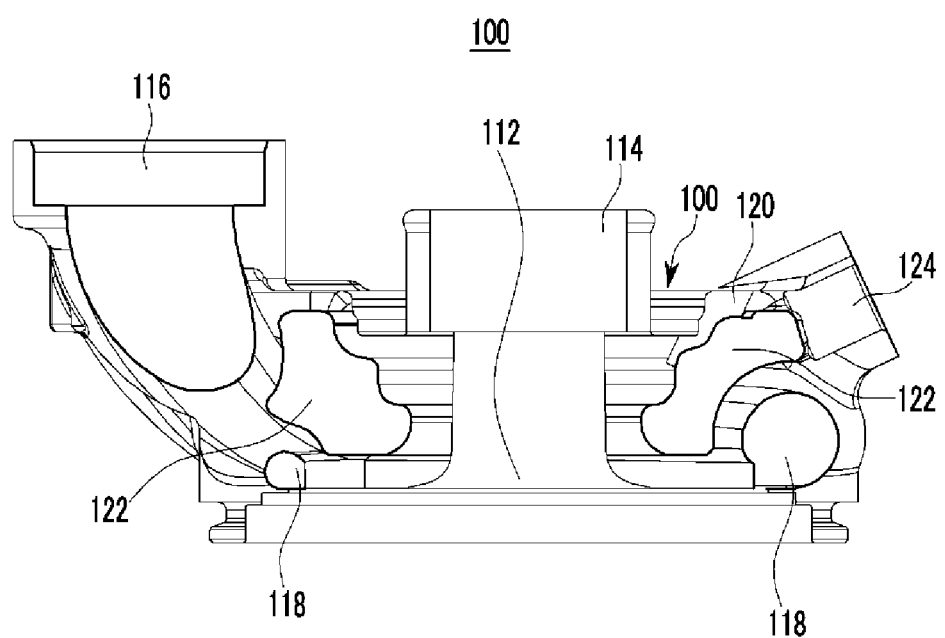
FIG. 3 is a cross-sectional view of FIG. 2.

FIG. 2 is a diagram illustrating a compressor housing according to various embodiments of the present invention and FIG. 3 is a cross-sectional view of FIG. 2.

Referring to FIGS. 2 and 3, the low-pressure compressor 25 includes the impeller 28 and the compressor housing 100.

The impeller 28 is provided within the compressor housing 100 and rotated by rotational force of a turbine wheel in connection with a turbine wheel of the low-pressure turbine 23.

The compressor housing 100 compresses the air suctioned from the impeller 28 and discharges the compressed air and includes a body 110 and the cooling chamber 120.

The body 110 is provided to surround the impeller 28 and includes an impeller seating portion 112, an air inflow hole 114, an air outflow hole 116, and an air path 118.

The impeller seating portion 112 is provided at the center of the body 110 to rotate the impeller 28. The air inflow hole 114 is provided at one side of the body 110 with the impeller seating portion 114 and is in communication with the impeller seating portion 112. The air outflow hole 116 is provided at the other side of the body 110.

The air path 118 is in communication with the air inflow hole 114 to the air outflow hole 116. The air path 118 is provided in a scroll shape to surround the impeller 28. As a result, air is suctioned through the air inflow hole 114 and compressed by the impeller 28 to be discharged to the air outflow hole 116 through the air path 118.

Figure 4:
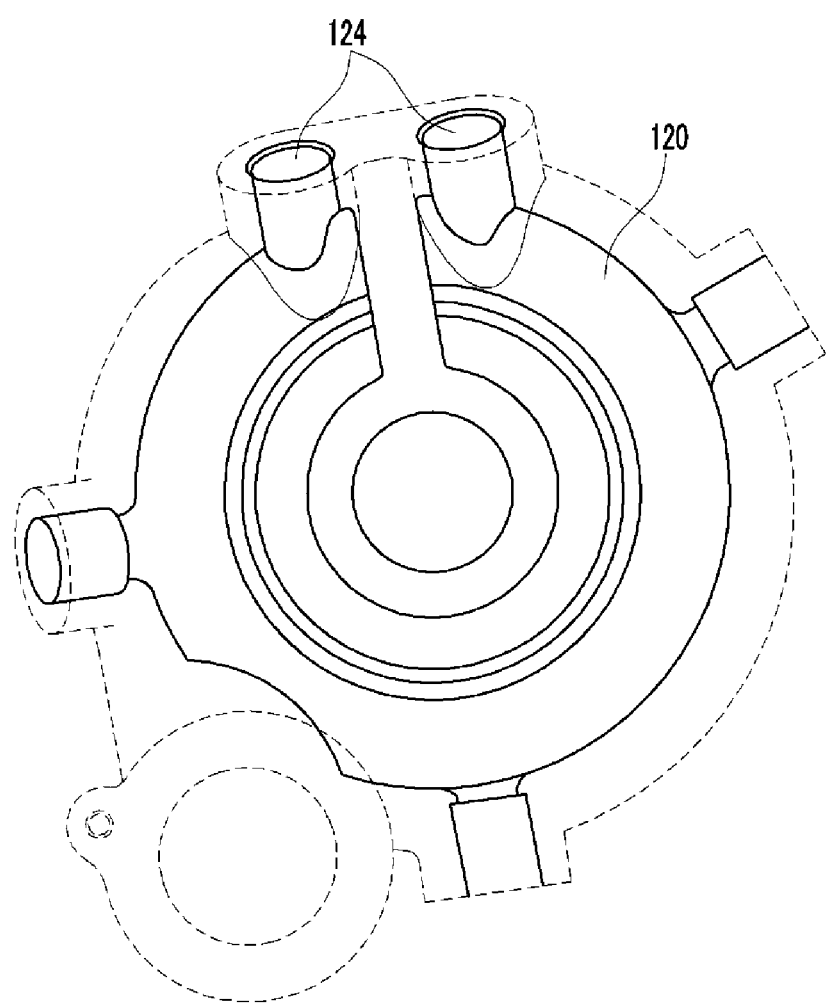
FIG. 4 is a diagram illustrating an exemplary cooling chamber according to the present invention.

FIG. 4 is a diagram illustrating a cooling chamber according to various embodiments of the present invention.

Referring to FIG. 4, the cooling chamber 120 is provided with the body 110 to cool the air that flows on the air path 118. The cooling chamber 120 includes a cooling water path 122 where the cooling water flows and a plurality of exits 124 through which the cooling water enters and exits.

The cooling chamber 120 is provided in an opposite direction to the low-pressure turbine 25 and formed along the air path 118 while adjacently surrounding an inner surface of the body 110 with the air path 118.

The cooling chamber 120 has an annular shape of which both ends are separated from each other and the plurality of exists 124 are formed at both ends of the cooling chamber 120. A line through which the cooling water flows in is installed at any one of the plurality of exists 124 and a line through which the cooling water flows out is installed at the other one. That is, the lines through which the cooling water flows in and out may be selectively connected to the plurality of exists 124. Therefore, a flow direction of the cooling water is set, and as a result, the plurality of exists 124 are connected to the flow-in line and flow-out line of the cooling water, respectively.

The cooling water path 122 is formed along the air path 118 in communication with the plurality of exists 124. Therefore, the cooling water that flows in through the exit 124 connected with the flow-in line of the cooling water cools the air that flows on the air path 118 through the cooling water path 122 and flows out through the exit 124 connected with the flow-out line of the cooling water.

In various embodiments, the cooling chamber 120 is applied to only the low-pressure compressor 20, but is not limited thereto and may be applied to even the high-pressure compressor 100.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A compressor housing of a turbocharger surrounding an impeller of a compressor, and compressing and discharging air suctioned from the impeller, comprising:
   a body including:
      an impeller seating portion mounting the impeller at a center of the body,
      an air inflow hole in communication with the impeller seating portion formed at a first side of the body,
      an air outflow hole formed at a second side of the body, and
      a scroll-shaped air path in communication with the air inflow hole to the air outflow hole and surrounding the impeller seating portion; and
   a cooling chamber provided in the body and including:
      a cooling water path through which cooling water flows and cools air flowing on the air path, and
      a plurality of exits in communication with the cooling water path,
   wherein the cooling chamber includes an annular shape having two ends, the two ends adjacent and separated from each other,
   wherein the plurality of exits includes two exits, the two exits respectively provided at the two ends of the cooling chamber, and
   wherein a full body of the cooling water path is disposed between the air inflow hole and the scroll-shaped air path.

2. The compressor housing of a turbocharger of claim 1, wherein:
   the cooling chamber and the air path adjacently surround an inner surface of the body.

3. The compressor housing of a turbocharger of claim 1, wherein:
   a line through which the cooling water flows in is selectively installed at one of the plurality of exits and a line through which the cooling water flows out is installed at another one of the plurality of exits.

4. A two-stage turbocharger in which a high pressure-stage turbocharger including a high-pressure turbine driven by exhaust gas discharged from an engine and a low pressure-stage turbocharger including a low-pressure turbine driven by the exhaust gas discharged after driving the high-pressure turbine are placed on a path of the exhaust gas, suctioned gas is primarily pressurized by a low-pressure compressor of the low pressure-stage turbocharger and secondarily pressurized by a high-pressure compressor of the high pressure-stage turbocharger, the two-stage turbocharger comprising:
   the low-pressure compressor including:
      an impeller rotated by the low-pressure turbine; and
      a compressor housing surrounding the impeller and compressing and discharging air suctioned from the impeller, and
   a body including:
      an impeller seating portion where the impeller is installed at a center of the body,
      an air inflow hole in communication with the impeller seating portion formed at a first side of the body,
      an air outflow hole formed at a second side of the body, and
      a scroll-shaped air path in communication with the air inflow hole to the air outflow hole and surrounding the impeller seating portion; and
   a cooling chamber provided in the body and including:
      a cooling water path through which cooling water flows and cools air that flows on the air path, and
      a plurality of exits in communication with the cooling water path,
   wherein the cooling chamber includes an annular shape having two ends, the two ends adjacent and separated from each other,
   wherein the plurality of exits includes two exits, the two exits respectively provided at the two ends of the cooling chamber, and
   wherein a full body of the cooling water path is disposed between the air inflow hole and the scroll-shaped air path.

5. The two-stage turbocharger of claim 4, wherein:
   the cooling chamber is provided in an opposite direction to the low-pressure turbine, and the cooling chamber and the air path adjacently surround an inner surface of the body.

* * * * *